US011888231B2

(12) United States Patent
Yoshikawa et al.

(10) Patent No.: US 11,888,231 B2
(45) Date of Patent: Jan. 30, 2024

(54) ANTENNA, WIRELESS COMMUNICATION MODULE, AND WIRELESS COMMUNICATION DEVICE

(71) Applicant: KYOCERA CORPORATION, Kyoto (JP)

(72) Inventors: Hiromichi Yoshikawa, Yokohama (JP); Nobuki Hiramatsu, Yokohama (JP); Masamichi Yonehara, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 234 days.

(21) Appl. No.: 17/614,554

(22) PCT Filed: Jun. 23, 2020

(86) PCT No.: PCT/JP2020/024664
§ 371 (c)(1),
(2) Date: Nov. 29, 2021

(87) PCT Pub. No.: WO2020/262404
PCT Pub. Date: Dec. 30, 2020

(65) Prior Publication Data

US 2022/0231426 A1 Jul. 21, 2022

(30) Foreign Application Priority Data

Jun. 25, 2019 (JP) ................................ 2019-117733

(51) Int. Cl.
*H01Q 21/06* (2006.01)
*H01Q 1/42* (2006.01)

(52) U.S. Cl.
CPC .......... *H01Q 21/061* (2013.01); *H01Q 1/422* (2013.01)

(58) Field of Classification Search
CPC ........ H01Q 21/061; H01Q 1/422; H01Q 1/38; H01Q 5/385; H01Q 9/0471; H01Q 15/006;
(Continued)

(56) References Cited

U.S. PATENT DOCUMENTS 5,438,697 A * 8/1995 Fowler .................. H01Q 23/00 333/204
7,592,960 B2 * 9/2009 Byrne .................. H01Q 1/3275 343/872
(Continued)

FOREIGN PATENT DOCUMENTS

EP 1227538 A1 7/2002
JP WO2018174026 A1 4/2019

OTHER PUBLICATIONS

Murakami et al., "Low-Profile Design and Bandwidth Characteristics of Artificial Magnetic Conductor with Dielectric Substrate", IEICE Transactions on Communications (B), 2015, vol. J98-B No. 2, pp. 172-179. 9pp.
(Continued)

*Primary Examiner* — Seung H Lee
(74) *Attorney, Agent, or Firm* — HAUPTMAN HAM, LLP

(57) ABSTRACT

An antenna includes a housing of a resin, a first conductor group, and a power supply line. The housing includes first and second surfaces opposite in a first direction, third and fourth surfaces opposite in a second direction, and a housing portion surrounded by the first-fourth surfaces. The third surface connects the first and second surfaces. The first conductor group includes a first conductor, a second conductor, a second conductor group, and a third conductor. The first conductor is closer to the first surface than the second surface. The second conductor is closer to the second surface than the first surface. The second conductor group extends
(Continued)

along the third surface and capacitively couples the first and second conductors. The third conductor extends along the fourth surface and electrically connects the first and second conductors. The power supply line is connected to any one portion of the second conductor group.

12 Claims, 8 Drawing Sheets

(58) Field of Classification Search
CPC ........ H01Q 1/243; H01Q 1/002; H01Q 1/241; H01Q 1/48
See application file for complete search history.

(56) References Cited

U.S. PATENT DOCUMENTS 7,636,063 B2 * 12/2009 Channabasappa ... H01Q 9/0442 343/700 MS
2020/0044351 A1 2/2020 Uchimura et al.

OTHER PUBLICATIONS

Murakami et al., "Optimum Configuration of Reflector for Dipole Antenna with AMC Reflector", IEICE Transactions on Communications (B), 2015, vol. J98-B No. 11, pp. 1212-1220. 10pp.

* cited by examiner

ANTENNA, WIRELESS COMMUNICATION MODULE, AND WIRELESS COMMUNICATION DEVICE

RELATED APPLICATIONS

The present application is a National Phase of International Application Number PCT/JP2020/024664, filed Jun. 23, 2020, and claims priority based on Japanese Patent Application No. 2019-117733, filed Jun. 25, 2019.

TECHNICAL FIELD

The present disclosure relates to an antenna, a wireless communication module, and a wireless communication device.

BACKGROUND ART

Electromagnetic waves emitted from an antenna are reflected by a metal conductor. A 180-degree phase shift occurs in the electromagnetic waves reflected by the metal conductor. The reflected electromagnetic waves combine with the electromagnetic waves emitted from the antenna. The amplitude may decrease as a result of the electromagnetic waves emitted from the antenna combining with the phase-shifted electromagnetic waves. As a result, the amplitude of the electromagnetic waves emitted from the antenna decreases. The effect of the reflected waves is reduced by the distance between the antenna and the metal conductor being set to ¼ of the wavelength λ of the emitted electromagnetic waves.

To address this, a technique for reducing the effect of reflected waves using an artificial magnetic wall has been proposed. This technology is described, for example, in Non-Patent Literature (NPL) 1 and 2.

CITATION LIST

Non-Patent Literature

NPL 1: Murakami et al., "Low-Profile Design and Bandwidth Characteristics of Artificial Magnetic Conductor with Dielectric Substrate", IEICE Transactions on Communications (B), Vol. J98-B No. 2, pp. 172-179

NPL 2: Murakami et al., "Optimum Configuration of Reflector for Dipole Antenna with AMC Reflector", IEICE Transactions on Communications (B), Vol. J98-B No. 11, pp. 1212-1220

SUMMARY OF INVENTION

Technical Problem

However, the techniques described in NPL 1 and 2 require a large number of resonator structures to be aligned.

The present disclosure is directed at providing a novel antenna, wireless communication module, and wireless communication device.

Solution to Problem

An antenna according to an embodiment of the present disclosure includes: a housing made of a resin, a first conductor group, and a power supply line, wherein the housing includes a first surface and a second surface facing each other in a first direction, a third surface extending in the first direction and connecting the first surface and the second surface, a fourth surface facing the third surface in a second direction intersecting the first direction, and a housing portion surrounded by the first surface, the second surface, the third surface, and the fourth surface; the first conductor group includes a first conductor located closer to the first surface than the second surface, a second conductor located closer to the second surface than to the first surface, a second conductor group extending along the third surface capacitively coupling the first conductor and the second conductor, and a third conductor extending along the fourth surface electrically connecting the first conductor and the second conductor; and the power supply line is connected to any one portion of the second conductor group.

An antenna according to an embodiment of the present disclosure includes: a housing that is made of a resin and that includes a housing portion; and a first conductor group including a first end portion and a second end portion separated from each other in a first direction, the first conductor group surrounding a front surface of the housing, wherein the first conductor group includes a first inner conductor and a second inner conductor capacitively coupled to each other, at least a portion of the first inner conductor and at least a portion of the second inner conductor being exposed to the housing portion, a first conductor set electrically connecting a region near the first end portion of the first conductor group and the first inner conductor, and a second conductor set electrically connecting a region near the second end portion of the first conductor group and the second inner conductor.

A wireless communication module according to an embodiment of the present disclosure includes: the antenna described above; and a radio frequency (RF) module located within the housing portion of the housing.

A wireless communication device according to an embodiment of the present disclosure includes: the wireless communication module described above; and a sensor located within the housing portion.

Advantageous Effects of Invention

According to an embodiment of the present disclosure, a novel antenna, wireless communication module, and wireless communication device can be provided.

DESCRIPTION OF EMBODIMENTS

Figure 1:
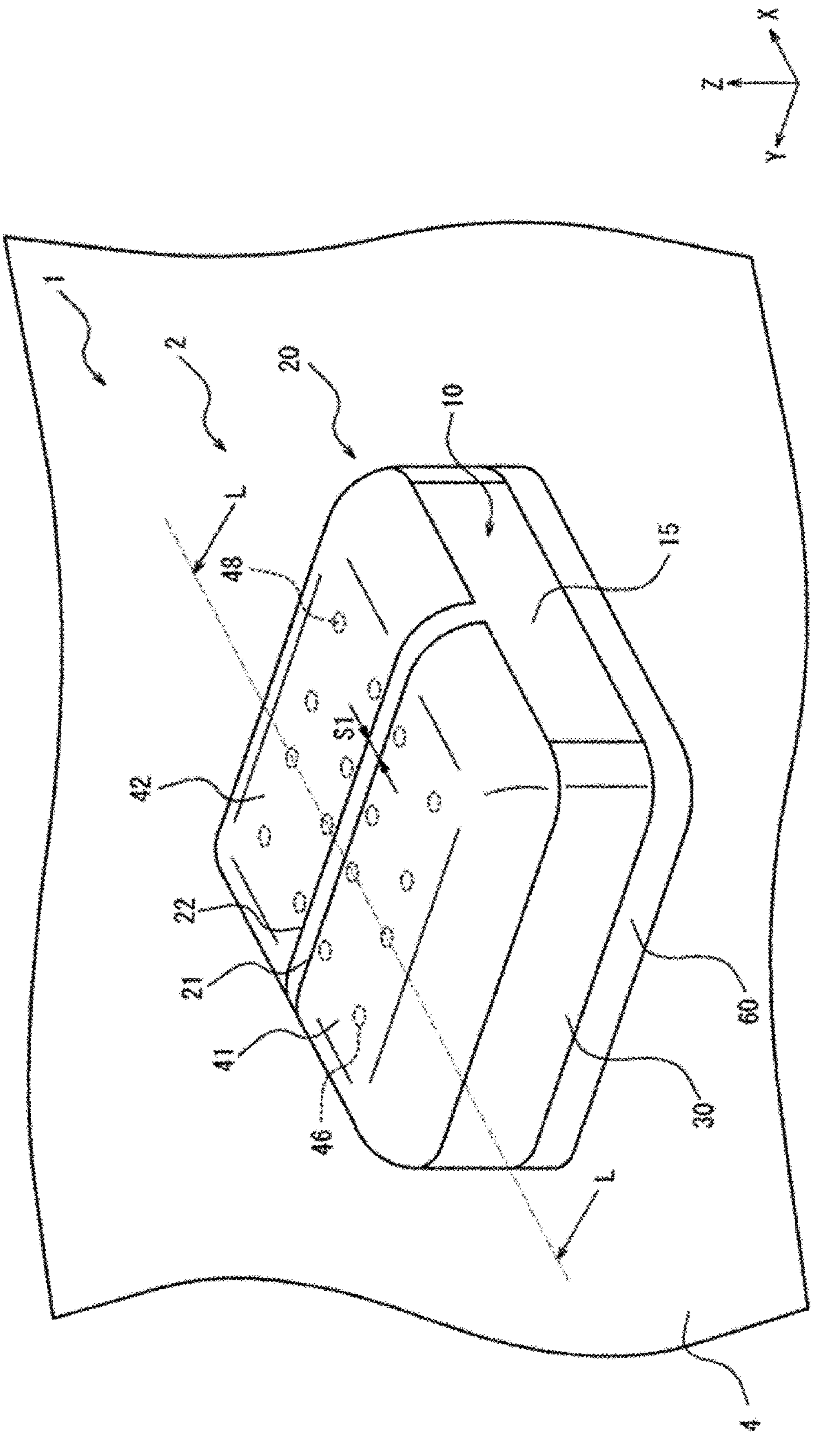
FIG. 1 is a perspective view of a wireless communication device according to a first embodiment of the present disclosure.

In the present disclosure, each requirement is configured to perform an executable operation. Thus, in the present disclosure, the operation executed by a requirement may mean that the requirement is configured to be able to execute the operation. In the present disclosure, a case where a requirement executes an operation may be paraphrased as the requirement is configured to be able to execute the operation. In the present disclosure, the operation able to be executed by the requirement may be paraphrased as the operation is able to be executed by a requirement provided or included in the requirement. In the present disclosure, in a case where one requirement causes another requirement to execute an operation, it may mean that the one requirement is configured to be able to cause the other requirement to execute the operation. In the present disclosure, a case where one requirement causes another requirement to execute an operation may be paraphrased as the one requirement is configured to control the other requirement so that the other requirement is caused to execute the operation. In the present disclosure, an operation executed by a requirement that is not described in the claims may be understood as being a non-essential operation.

In the present disclosure, each requirement has a functional enabled state. Thus, the functional state of a requirement may mean that the requirement is configured to be functional. In the present disclosure, a case where each requirement has a functional enabled state may be paraphrased as the requirement is configured to be in a functional state.

In the present disclosure, "dielectric material" may include a composition of either a ceramic material or a resin material. Examples of the ceramic material include an aluminum oxide sintered body, an aluminum nitride sintered body, a mullite sintered body, a glass ceramic sintered body, crystallized glass yielded by precipitation of a crystal component in a glass base material, and a microcrystalline sintered body such as mica or aluminum titanate. Examples of the resin material include an epoxy resin, a polyester resin, a polyimide resin, a polyamide-imide resin, a polyetherimide resin, and resin materials yielded by curing an uncured liquid crystal polymer or the like.

The "electrically conductive material" in the present disclosure may include a composition of any of a metal material, an alloy of metal materials, a cured metal paste, and a conductive polymer. Examples of the metal material include copper, silver, palladium, gold, platinum, aluminum, chrome, nickel, cadmium lead, selenium, manganese, tin, vanadium, lithium, cobalt, and titanium. The alloy includes a plurality of metallic materials. The metal paste includes the result of kneading a powder of a metal material with an organic solvent and a binder. Examples of the binder include an epoxy resin, a polyester resin, a polyimide resin, a polyamide-imide resin, and a polyetherimide resin. Examples of the conductive polymer include a polythiophene polymer, a polyacetylene polymer, a polyaniline polymer, and a polypyrrole polymer.

Embodiments of the present disclosure will be described below with reference to the drawings. In the following drawings, a Cartesian coordinate system of an X-axis, a Y-axis, and a Z-axis is used. Hereinafter, in cases where the positive direction of the X-axis and the negative direction of the X-axis are not particularly distinguished, the positive direction of the X-axis and the negative direction of the X-axis are collectively referred to as the "X direction". In cases where the positive direction of the Y-axis and the negative direction of the Y-axis are not particularly distinguished, the positive direction of the Y-axis and the negative direction of the Y-axis are collectively referred to as the "Y direction". In cases where the positive direction of the Z-axis and the negative direction of the Z-axis are not particularly distinguished, the positive direction of the Z-axis and the negative direction of the Z-axis are collectively referred to as the "Z direction".

Hereinafter, a first direction represents the X direction. A second direction represents the Z direction. A third direction represent the Y direction. However, the first direction and the second direction need not be orthogonal. The first direction and the second direction only need to intersect. Furthermore, the third direction does not need to be orthogonal to the first direction and the second direction. The third direction only needs to intersect the first direction and the second direction.

First Embodiment

Figure 2:
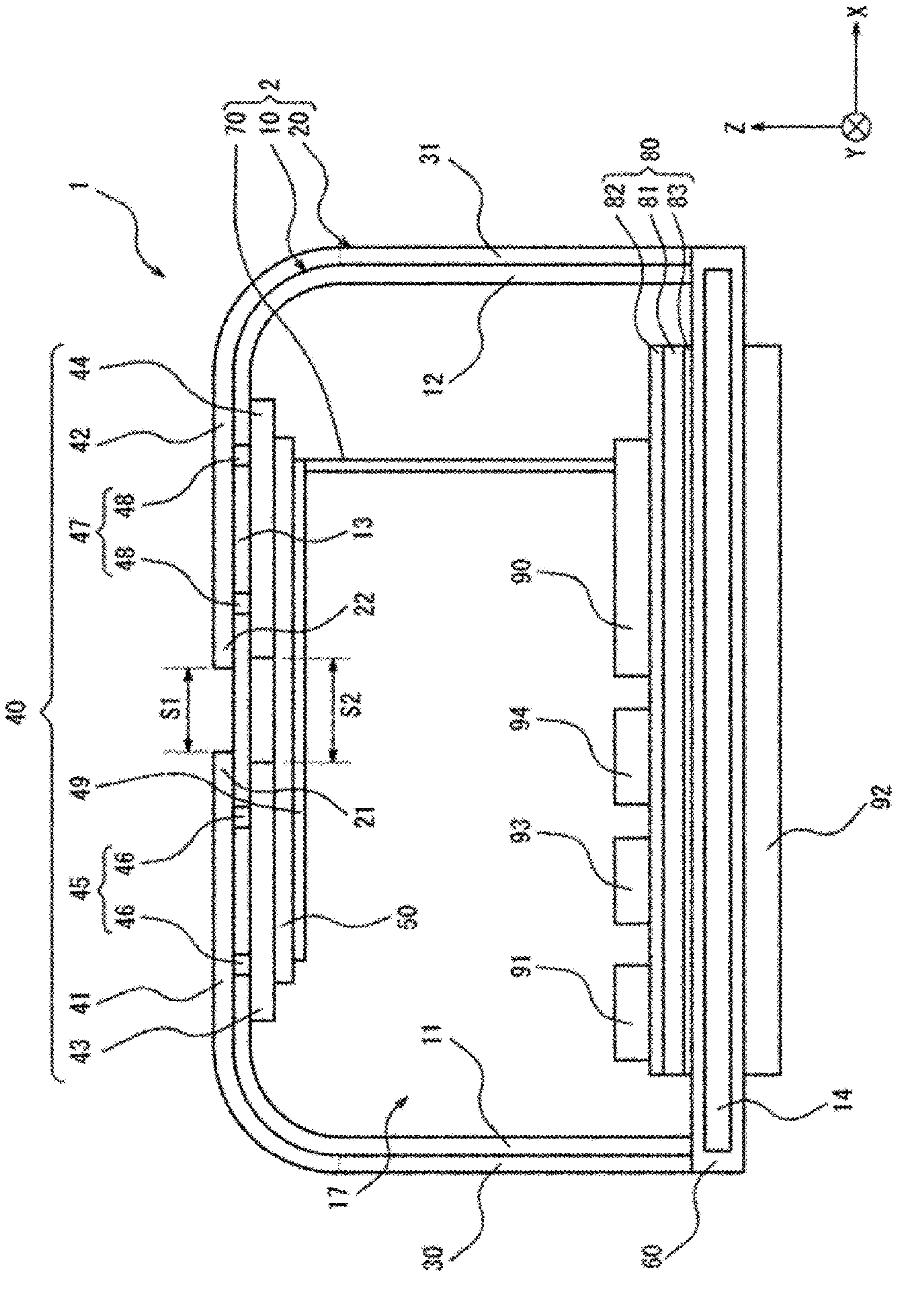
FIG. 2 is a cross-sectional view of the wireless communication device taken along L-L illustrated in FIG. 1.

As illustrated in FIG. 1, a wireless communication device 1 is roughly a square prism. The wireless communication device 1 includes two surfaces that are substantially parallel to the XY plane. The two surfaces are roughly square. The wireless communication device 1 includes an antenna 2. As illustrated in FIG. 2, the wireless communication device 1 may include a circuit board 80.

As described below, the antenna 2 exhibits an artificial magnetic conductor character with respect to a predetermined frequency of electromagnetic waves incident on the XY plane included in the wireless communication device 1 from the positive Z-axis side. In the present disclosure, "artificial magnetic conductor character" means a characteristic of a surface where the phase difference between incident waves and reflected waves becomes 0 degrees. On the surface having the artificial magnetic conductor character, the phase difference between the incident waves and reflected waves in the frequency band ranges from −90 degrees to +90 degrees. By the antenna 2 exhibiting such an artificial magnetic conductor character, the emission efficiency of the antenna 2 can be maintained even when a metal plate 4 is positioned on the negative Z-axis side of the wireless communication device 1, as illustrated in FIG. 1.

As illustrated in FIG. 2, the antenna 2 includes a housing 10, a first conductor group 20, and a power supply line 70. The antenna 2 is configured with the housing 10 of the wireless communication device 1. The antenna 2 may include a dielectric substrate 50.

Figure 3:
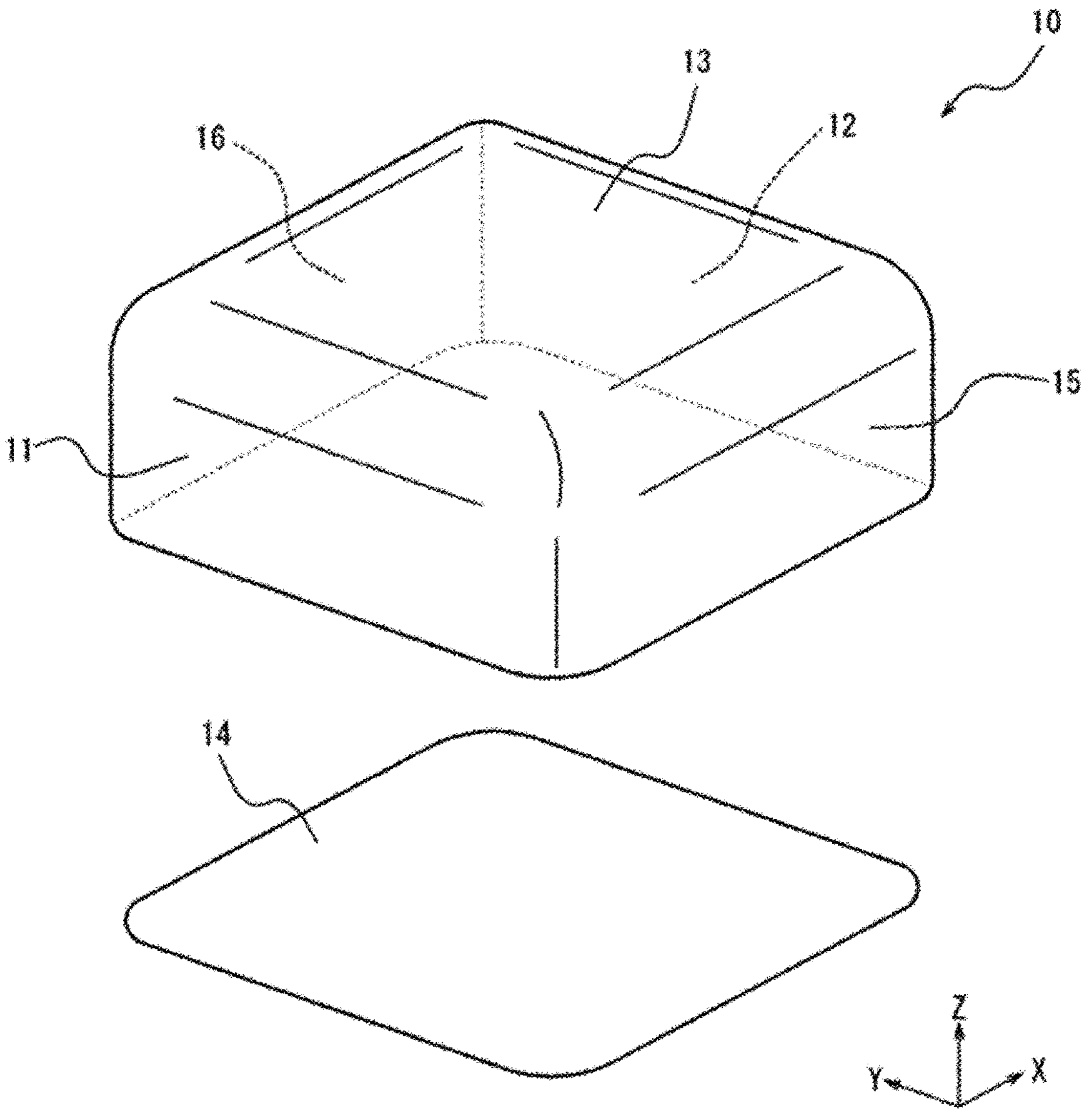
FIG. 3 is an exploded perspective view of a portion of a housing illustrated in FIG. 1.

Various components of the wireless communication device 1 are housed in the housing 10. The housing 10 is made of a resin. That is, the housing 10 includes a dielectric material. As illustrated in FIG. 3, the housing 10 is roughly a square prism. The corner portions of the housing 10, which is roughly a square prism, may have a rounded shape. However, the corner portions of the housing may have an angular shape. As illustrated in FIG. 3, the housing 10 includes a first surface 11, a second surface 12, a third surface 13, a fourth surface 14, a fifth surface 15, and a sixth surface 16. As illustrated in FIG. 2, the housing 10 includes a housing portion 17.

As illustrated in FIG. 3, the first surface 11 and the second surface 12 face each other in the X direction. Each of the first surface 11 and the second surface 12 may extend along the YZ plane. Each of the first surface 11 and the second surface 12 may be, for example, roughly rectangular and have the same shape.

The third surface 13 extends along the X direction and connects the first surface 11 and the second surface 12. The third surface 13 may extend along the Y direction and connect the fifth surface 15 and the sixth surface 16. The third surface 13 may extend along the XY plane. The third surface 13 may be roughly square.

The fourth surface 14 faces the third surface 13 in the Z direction. The fourth surface 14 extends along the X direction and connects the first surface 11 and the second surface 12. The fourth surface 14 may extend along the Y direction and connect the fifth surface 15 and the sixth surface 16. The fourth surface 14 may extend along the XY plane. The fourth surface 14 may be roughly square and, for example, have the same shape as the third surface 13.

The fifth surface 15 and the sixth surface 16 face each other in the Y direction. Each of the fifth surface 15 and the sixth surface 16 may extend along the XZ plane. Each of the fifth surface 15 and the sixth surface 16 may be roughly rectangular and, for example, have the same shape.

As illustrated in FIG. 2, a component such as an RF module 90 described below is located inside the housing portion 17. The housing portion 17 is surrounded by the first surface 11, the second surface 12, the third surface 13, and the fourth surface 14. The housing portion 17 may be defined as the region surrounded by the first surface 11, the second surface 12, the third surface 13, the fourth surface 14, the fifth surface 15, and the sixth surface 16.

As illustrated in FIG. 1, the first conductor group 20 surrounds the front surface of the housing 10. For example, the first conductor group 20 surrounds the front surface of the housing 10 except for a portion of the fifth surface 15 on the negative Y-axis side and a portion of the sixth surface 16 on the positive Y-axis side within the front surface of the housing 10. The first conductor group 20 may be formed on the front surface of the housing 10 by curing uncured electrically conductive material applied to the top surface of the housing 10.

The first conductor group 20 includes a first end portion 21 and a second end portion 22. The first end portion 21 and the second end portion 22 are separated from each other in the X direction. The first end portion 21 and the second end portion 22 are located separated by a gap S1 in the X direction. The width of the gap S1 in the X direction may be appropriately adjusted in accordance with the frequency used in the wireless communication device 1. The first end portion 21 and the second end portion 22 are capacitively coupled via the gap S1.

Figure 4:
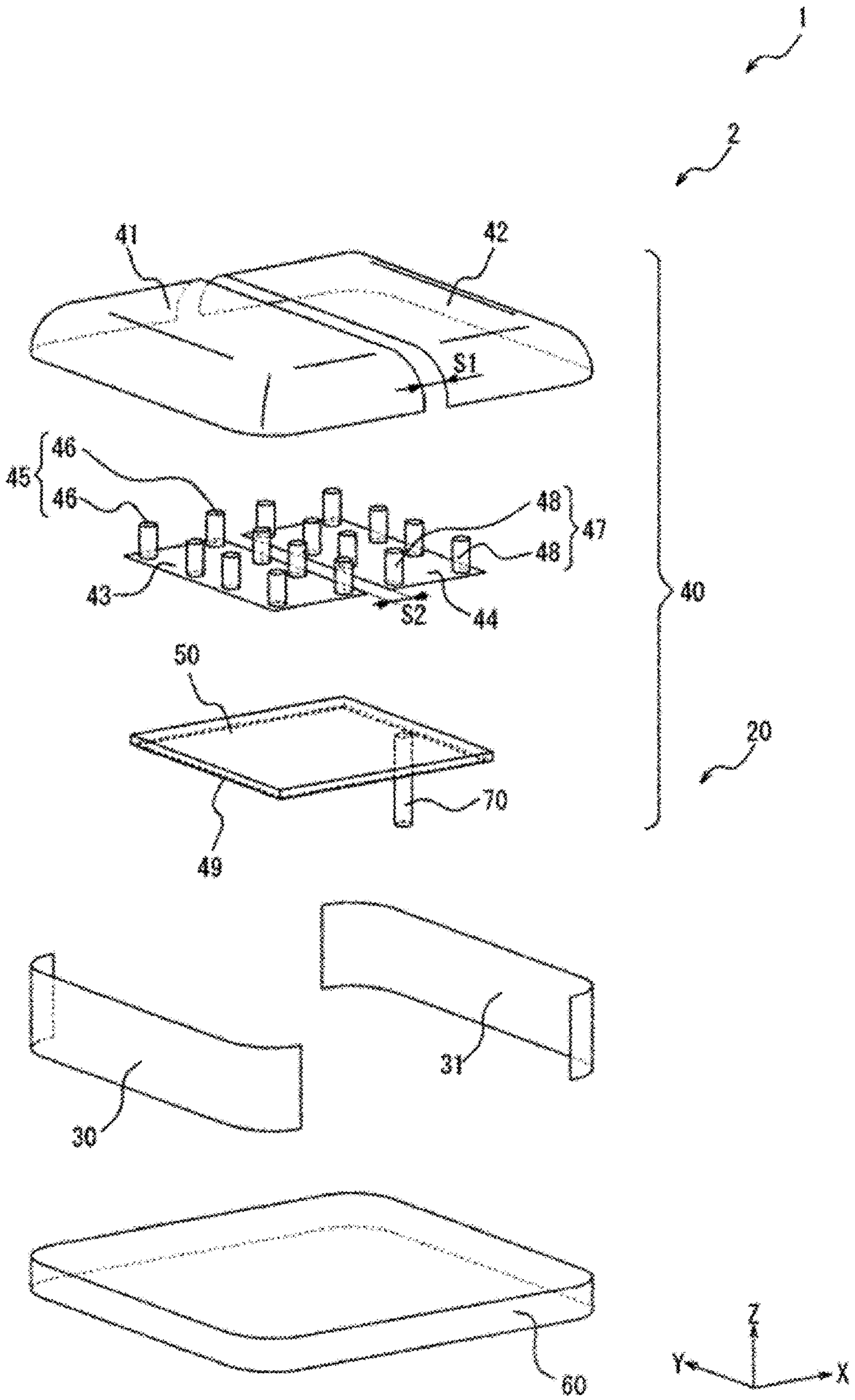
FIG. 4 is an exploded perspective view of a portion of the wireless communication device illustrated in FIG. 1.

As illustrated in FIG. 4, the first conductor group 20 includes a first conductor 30, a second conductor 31, a second conductor group 40, and a third conductor 60. Each of the first conductor 30, the second conductor 31, the second conductor group 40, and the third conductor 60 may be formed of the same electrically conductive material or may be formed of different electrically conductive materials.

As illustrated in FIG. 2, the first conductor 30 is located closer to the first surface 11 of the housing 10 as opposed to the second surface 12 of the housing 10. The second conductor 31 is located closer to the second surface 12 of the housing 10 than the first surface 11 of the housing 10. With the first conductor 30 being located on the first surface 11 side and the second conductor 31 being located on the second surface 11 side, the first conductor 30 and the second conductor 31 face each other in the X direction. The first conductor 30 and the second conductor 31 may be respectively located on the front surfaces of the first surface 11 and the second surface 12 corresponding to outward-facing surfaces of the housing 10. The first conductor 30 and the second conductor 31 may extend along the first surface 11 and the second surface 12, respectively.

As illustrated in FIG. 2, the second conductor group 40 extends along the third surface 13 of the housing 10. The second conductor group 40, for example, capacitively couples the first conductor 30 and the second conductor 31 via the first end portion 21 and the second end portion 22. The second conductor group 40 is located between the first conductor 30 and the second conductor 31. By the second conductor group 40 being located between the first conductor 30 and the second conductor 31, as seen from the second conductor group 40, the first conductor 30 is treated as an electrical wall extending in the YZ plane on the negative X-axis side, and the second conductor 31 is treated as an electrical wall extending in the YZ plane on the positive X-axis side. Moreover, no conductor or the like is disposed on the end of the second conductor group 40 on the positive Y-axis side and the end of the second conductor group 40 on the negative Y-axis side. In other words, the end of the second conductor group 40 on the positive Y-axis side and the end of the second conductor group 40 on the negative Y-axis side are electrically open. Because the end of the second conductor group 40 on the positive Y-axis side and the end of the second conductor group 40 on the negative Y-axis side are electrically open, as seen from the second conductor group 40, the XZ plane on the positive Y-axis side and the XZ plane on the negative Y-axis side are treated as magnetic walls. The second conductor group 40 is surrounded by these two electrical walls and two magnetic walls, thus the antenna 2 exhibits artificial magnetic conductor specification with respect to a predetermined frequency of electromagnetic waves incident on the wireless communication device 1 from the positive Z-axis side.

As illustrated in FIG. 4, the second conductor group 40 includes a first connection conductor 41, a second connection conductor 42, a first inner conductor 43, a second inner conductor 44, a first conductor set 45, and a second conductor set 47. The second conductor group 40 may include a third inner conductor 49.

As illustrated in FIG. 1, each of the first connection conductor 41 and the second connection conductor 42 extend along the third surface 13 of the housing 10. As illustrated in FIG. 2, at least a portion of each of the first connection conductor 41 and the second connection conductor 42 may be exposed to outside of the housing 10. Each of the first connection conductor 41 and the second connection conductor may be located on the front surface of the third surface 13 corresponding to the outward-facing surface of the housing 10. As illustrated in FIG. 2, the first connection conductor 41 is located on the negative X-axis side of the third surface 13 substantially parallel to the XY plane. The second connection conductor 42 is located on the positive X-axis side of the third surface 13 substantially parallel to the XY plane. The portion of the first connection conductor 41 on the negative X-axis side is electrically connected to the first conductor 30. The portion of the second connection conductor 42 on the positive X-axis side is electrically connected to the second conductor 31.

The first connection conductor 41 and the second connection conductor 42 are capacitively coupled via the gap S1 between the first end portion 21 and the second end portion 22. The first end portion 21 is a portion on the positive X-axis side of the first connection conductor 41. The second end portion 22 is a portion on the negative X-axis side of the second connection conductor 42.

The first connection conductor 41 and the second connection conductor 42 may be roughly rectangular and, for example, have the same shape. The long sides of each of the first connection conductor 41 and the second connection conductor 42 that are roughly rectangular may be substantially parallel to the Y direction. The short sides of each of the first connection conductor 41 and the second connection conductor 42 that are roughly rectangular may be substantially parallel to the X direction.

Each of the first inner conductor 43 and the second inner conductor 44 extend along the third surface 13 of the housing 10. As illustrated in FIG. 2, the first inner conductor 43 faces the first connection conductor 41. The first inner conductor 43 is located closer to the housing portion 17 of the housing 10 than the first connection conductor 41. The second inner conductor 44 faces the second connection conductor 42. The second inner conductor 44 is located closer to the housing portion 17 of the housing 10 than the second connection conductor 42. At least a portion of each of the first inner conductor 43 and the second inner conductor 44 may be exposed to the housing portion 17 of the housing 10. Each of the first inner conductor 43 and the second inner conductor 44 may be located on the front surface of the third surface 13 corresponding to the inward-facing surface of the housing 10.

The first inner conductor 43 and the second inner conductor 44 are located separated in the X direction. For example, the first inner conductor 43 and the second inner conductor 44 are located separated in the X direction by a gap S2. The first inner conductor 43 and the second inner conductor 44 are capacitively coupled via the gap S2. The width of the gap S2 in the X direction may be appropriately adjusted in consideration of the desired magnitude of the capacitive coupling between the first inner conductor 43 and the second inner conductor 44.

A capacitor may be connected between the first inner conductor 43 and the second inner conductor 44. The capacitor may be used to bring the magnitude of the capacitive connection between the first inner conductor 43 and the second inner conductor 44 to a desired value. The capacitor is connected between the first inner conductor 43 and the second inner conductor 43, allowing the capacitive connection between the first inner conductor 43 and the second inner conductor 44 to be increased.

The first inner conductor 43 and the second inner conductor 44 may be, for example, roughly rectangular and have the same shape. The long sides of each of the first inner conductor 43 and the second inner conductor 44 that are roughly rectangular may be substantially parallel to the Y direction. The short sides of each of the first inner conductor 43 and the second inner conductor 44 that are roughly rectangular may be substantially parallel to the X direction.

As illustrated in FIG. 2, the first conductor set 45 electrically connects the first connection conductor 41 and the first inner conductor 43. In other words, the first conductor set 45 electrically connects a region near the first end portion 21 of the first conductor group 20 and the first inner conductor 43. The first conductor set 45 includes at least one third connection conductor 46. In the present embodiment, the first conductor set 45 includes a plurality of the third connection conductors 46.

The plurality of third connection conductors 46 are located separated in the X direction. The plurality of third connection conductors 46 may be located separated in the Y direction. One end of the third connection conductor 46 is electrically connected to the first connection conductor 41. The other end of the third connection conductor 46 is electrically connected to the first inner conductor 43. The third connection conductor 46 may extend along the Z direction. At least a portion of the third connection conductor 46 may be located within the first surface 13 of the housing 10. The third connection conductor 46 may be a through hole conductor, a via conductor, or the like.

As illustrated in FIG. 2, the second conductor set 47 electrically connects the second connection conductor 42 and the second inner conductor 44. In other words, the second conductor set 47 electrically connects a region near the second end portion 22 of the first conductor group 20 and the second inner conductor 44. The second conductor set 47 includes at least one fourth connection conductor 48. In the present embodiment, the second conductor set 47 includes a plurality of the fourth connection conductors 48.

The plurality of fourth connection conductors 48 are located separated in the X direction. The plurality of fourth connection conductors 48 may be located separated in the Y direction. One end of the fourth connection conductor 48 is electrically connected to the second connection conductor 42. The other end of the fourth connection conductor 48 is electrically connected to the second inner conductor 44. The fourth connection conductor 48 may extend along the Z direction. At least a portion of the fourth connection conductor 48 may be located within the first surface 13 of the housing 10. The fourth connection conductor 48 may be a through hole conductor, a via conductor, or the like.

As illustrated in FIG. 2, the third inner conductor 49 faces the first inner conductor 43 and the second inner conductor 44. The third inner conductor 43 may be located more to the negative Z-axis side than the first inner conductor 43 and the second inner conductor 44.

The third inner conductor 49 capacitively couples the first inner conductor 43 and the second inner conductor 44. The third inner conductor 49 capacitively connects the first inner conductor 43 and the second inner conductor 44, allowing the capacitive connection between the first inner conductor 43 and the second inner conductor 44 to be increased. The dielectric substrate 50 may be located between the third inner conductor 49 and the first inner conductor 43 and the second inner conductor 44. The dielectric material included in the dielectric substrate 50 can be the same as or different from the dielectric material included in the housing 10. The dielectric constant of the dielectric substrate 50 may be appropriately adjusted in consideration of the desired magnitude of the capacitive coupling between the first inner conductor 43 and the second inner conductor 44. The third inner conductor 49 may be roughly square. The area of the third inner conductor 49 may be appropriately adjusted in consideration of the desired magnitude of the capacitive coupling between the first inner conductor 43 and the second inner conductor 44.

The third conductor 60 expands along the fourth surface 14 of the housing 10. The third conductor 60 may be configured to surround the periphery of the fourth surface 14. In other words, the fourth surface 14 may be included within the third conductor 60. By including the fourth surface 14 within the third conductor 60, the overall weight of the wireless communication device 1 can be reduced compared with a case where the interior of the third conductor 60 is composed of a conductor. The electric potential of the third conductor 60 may be used as a reference potential of the wireless communication device 1.

The third conductor 60 electrically connects the first conductor 30 and the second conductor 31. For example, a portion of the third conductor 60 on the negative X-axis side is electrically connected to the first conductor 30. A portion of the third conductor 60 on the positive X-axis side is electrically connected to the second conductor 31.

The power supply line 70 is electrically connected to any one portion of the second conductor group 40. In the present disclosure, an “electromagnetic connection” may be an electrical connection or a magnetic connection. In the present embodiment, one end of the power supply line 70 is electrically connected to the third inner conductor 49 of the second conductor group 40. The other end of the power supply line 70 is electrically connected to the RF module 90 described below. The power supply line 70 is located within the housing portion 17 of the housing 10. The power supply line 70 may extend along the Z direction. The power supply line 70 may be a through hole conductor, a via conductor, or the like.

When the antenna 2 emits electromagnetic waves, the power supply line 70 supplies power from the RF module 90 described below to the second conductor group 40. When the antenna 2 receives electromagnetic waves, the power supply line 70 supplies power from the second conductor group 40 to the RF module 90 described below.

As illustrated in FIG. 2, the circuit board 80 is located within the housing portion 17 of the housing 10. The circuit board 80 may be a printed circuit board (PCB). Components such as the RF module 90 described below may be disposed on the circuit board 80. The circuit board 80 includes an insulation substrate 81, a conductor layer 82, and a conductor layer 83. The insulation substrate 81 is substantially parallel to the XY plane. The conductor layer 82 is located on the surface on the positive Z-axis side of the two surfaces that are substantially parallel to the XY plane included in the insulation substrate 18. The conductor layer 82 electrically connects various components disposed on the circuit board 80. The conductor layer 82 is also referred to as a wiring layer. The conductor layer 83 is located on the surface on the negative Z-axis side of the two surfaces that are substantially parallel to the XY plane included in the insulation substrate 18. The conductor layer 83 is electrically connected to the third conductor 60 by, for example, an electrically conductive adhesive. The conductor layer 83 is also referred to as a ground layer. The conductor layer 83 may be integrally formed with the third conductor 60.

Figure 5:
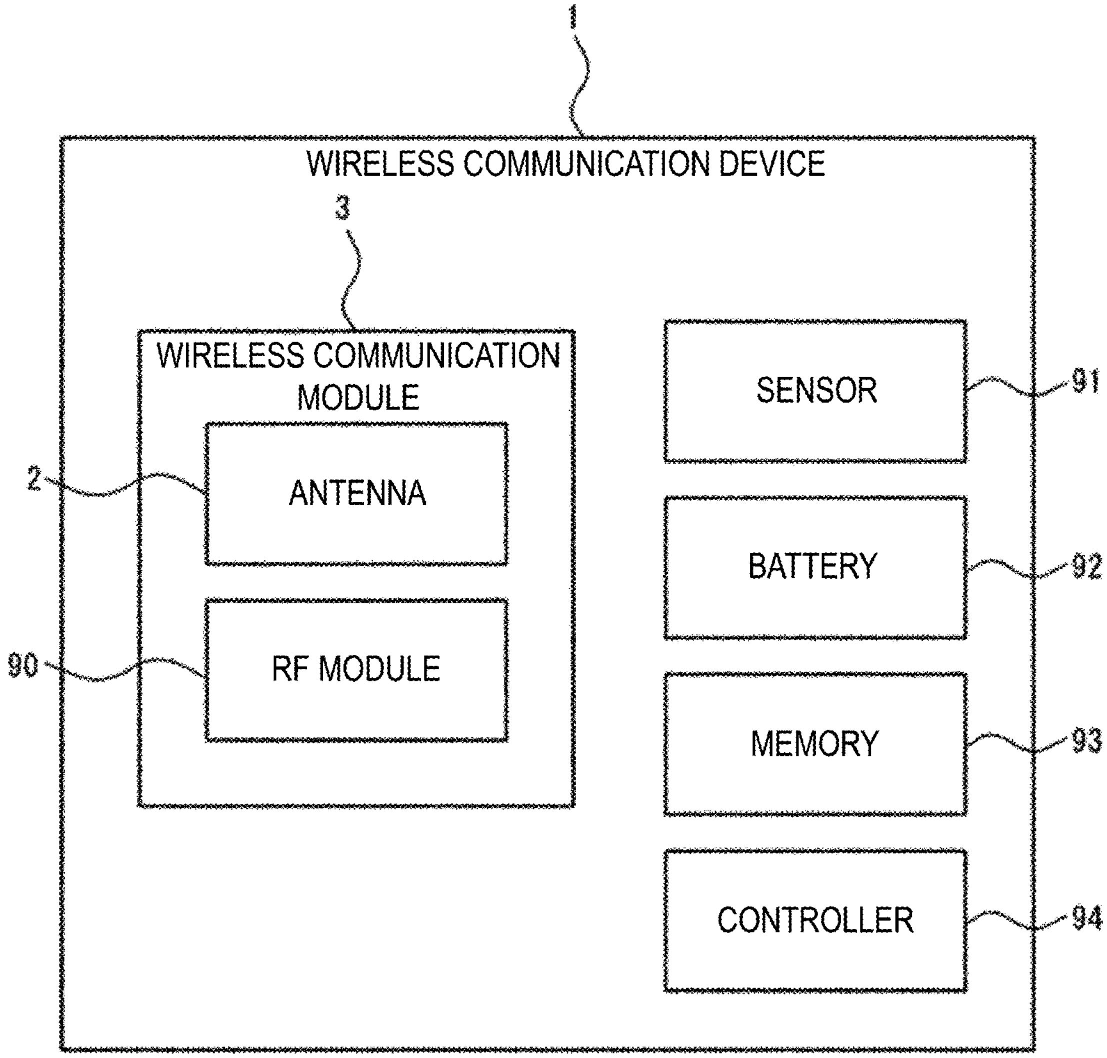
FIG. 5 is a functional block diagram of the wireless communication device illustrated in FIG. 1.

As illustrated in FIG. 5, the wireless communication device 1 includes a wireless communication module 3, a sensor 91, a battery 92, a memory 93, and a controller 94. The wireless communication module 3 includes the antenna 2 and the RF module 90.

As illustrated in FIG. 2, the RF module 90 is located within the housing portion 17 of the housing 10. The RF module 90 is located on the circuit board 80. The RF module 90 is electrically connected to the power supply line 70. The RF module 90 is electrically connected to the antenna 2 via the power supply line 70.

The RF module 90 may control the electrical power supplied to the antenna 2. The RF module 90 modulates the baseband signal and generates an RF signal. RF signals generated by the RF module 90 may be emitted from the antenna 2. The RF module 90 may modulate an electrical signal received by the antenna 2 into a baseband signal. The RF module 90 outputs a baseband signal to the controller 94.

As illustrated in FIG. 2, the sensor 91 is located within the housing portion 17 of housing 10. The sensor 91 may be located on the circuit board 80. The sensor 91 may, for example, include at least one of a speed sensor, a vibration sensor, an acceleration sensor, a gyro sensor, a rotation angle sensor, an angular velocity sensor, a geomagnetic sensor, a magnetic sensor, a temperature sensor, a humidity sensor, an atmospheric pressure sensor, a light sensor, an illuminance sensor, a UV sensor, a gas sensor, a gas density sensor, an atmospheric sensor, a level sensor, an odor sensor, a pressure sensor, an air pressure sensor, a contact sensor, a wind sensor, an infrared sensor, a human sensor, a displacement sensor, an image sensor, a weight sensor, a smoke sensor, a leak sensor, a vital sensor, a battery level sensor, an ultrasound sensor, a global positioning system (GPS) signal receiver, or the like. The sensor 91 outputs the detection result to the controller 94.

As illustrated in FIG. 2, the battery 92 is located more to the negative Z-axis side than the third conductor 60. The battery 92 may be located outside the housing 10. The battery 92 is capable of supplying electrical power to the components of the wireless communication device 1. The battery 92 may provide electrical power to at least one of the RF module 90, the sensor 91, the memory 93, or the controller 94. The battery 92 may include at least one of a primary battery or a secondary battery. The negative pole of the battery 92 is electrically connected to the third conductor 60 of the antenna 2.

As illustrated in FIG. 2, the memory 93 is located within the housing portion 17 of the housing 10. The memory 93 may be located on the circuit board 80. The memory 93 may include, for example, a semiconductor memory or the like. The memory 93 may function as a working memory for the controller 94. The memory 93 may be included in the controller 94. The memory 93 stores programs describing processing contents for implementing the functions of the wireless communication device 1, information used for processing in the wireless communication device 1, and the like.

As illustrated in FIG. 2, the controller 94 is located within the housing portion 17 of the housing 10. The controller 94 may be located on the circuit board 80.

The controller 94 may include a processor, for example. The controller 94 may include one or more processors. The processor may include a general-purpose processor that reads a specific program in order to execute a specific function, and a dedicated processor dedicated to specific processing. A dedicated processor may include an application-specific IC. The application-specific IC is also referred to as an Application Specific Integrated Circuit (ASIC). The processor may include a programmable logic device. The programmable logic device is also called a Programmable Logic Device (PLD). The PLD may include a Field-Programmable Gate Array (FPGA). The controller 94 may be either a System-on-a-Chip (SoC) or a System In a Package (SiP) that cooperates with one or more processors. The controller 94 may store various information and programs for causing the memory 93 to operate the components of the wireless communication device 1.

The controller 94 generates a baseband signal. For example, the controller 94 obtains the detection result of the sensor 91. The controller 94 generates a baseband signal according to the obtained detection result. The controller 94 outputs the generated baseband signal to the RF module 90.

The controller 94 may obtain a baseband signal from RF module 90. The controller 94 executes processing according to the obtained baseband signal.

As described above, in the wireless communication device 1 according to the first embodiment, even if there are no rows of resonator structures, the antenna 2 can emit electromagnetic waves without reducing emission efficiency. Furthermore, the antenna 2 includes the housing 10 made of a resin and the first conductor group 20 surrounding the front surface of the housing 10. In other words, in the present embodiment, the antenna 2 can be configured with the housing 10 of the wireless communication device 1.

Configuring the antenna 2 with the housing 10 can reduce the number of components composing the antenna 2 in the wireless communication device 1. Thus, according to the present embodiment, the antenna 2, wireless communication module 3, and wireless communication device 1, which are novel, can be provided.

Second Embodiment

Figure 6:
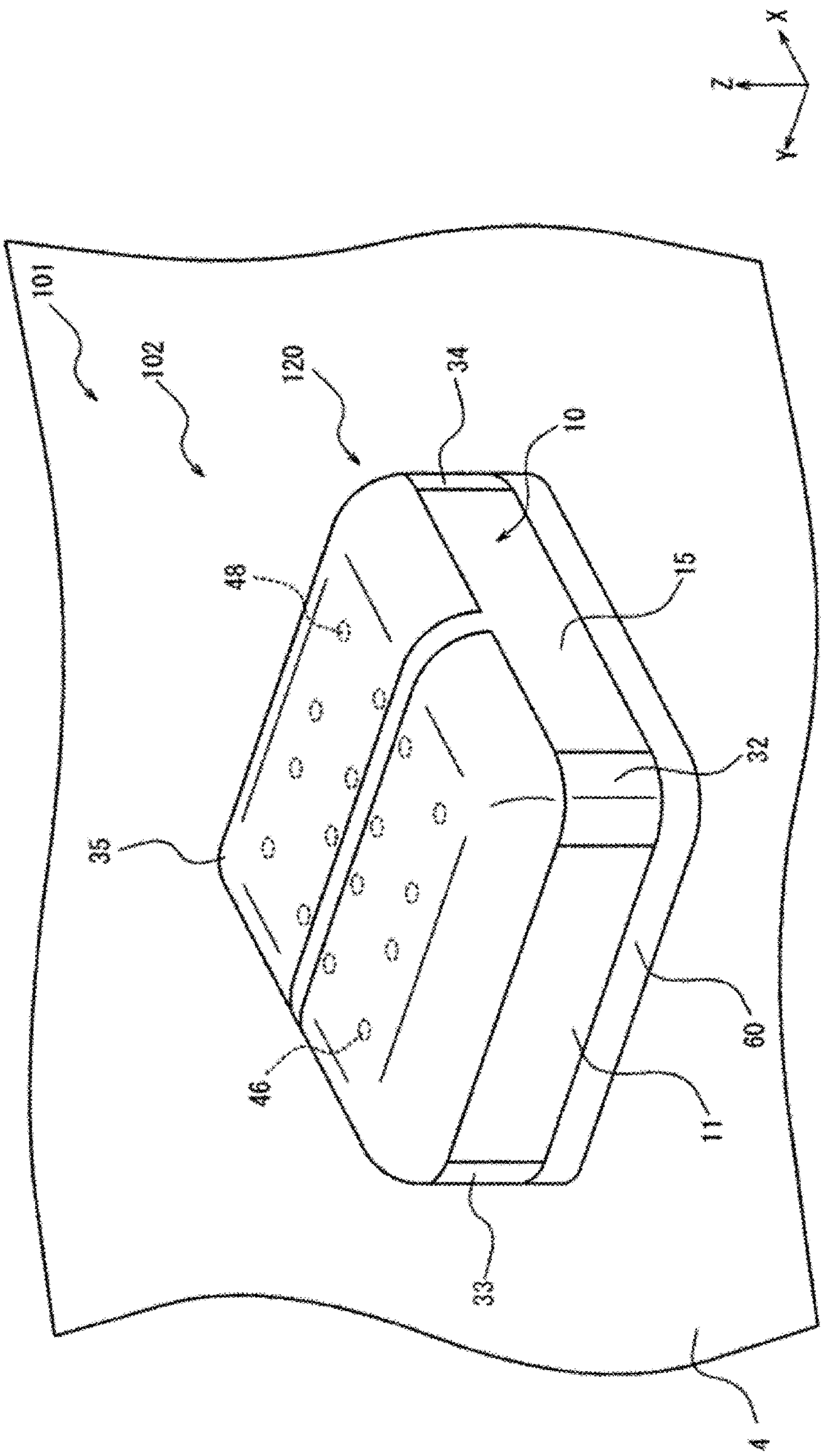
FIG. 6 is a perspective view of a wireless communication device according to a second embodiment of the present disclosure.
Figure 7:
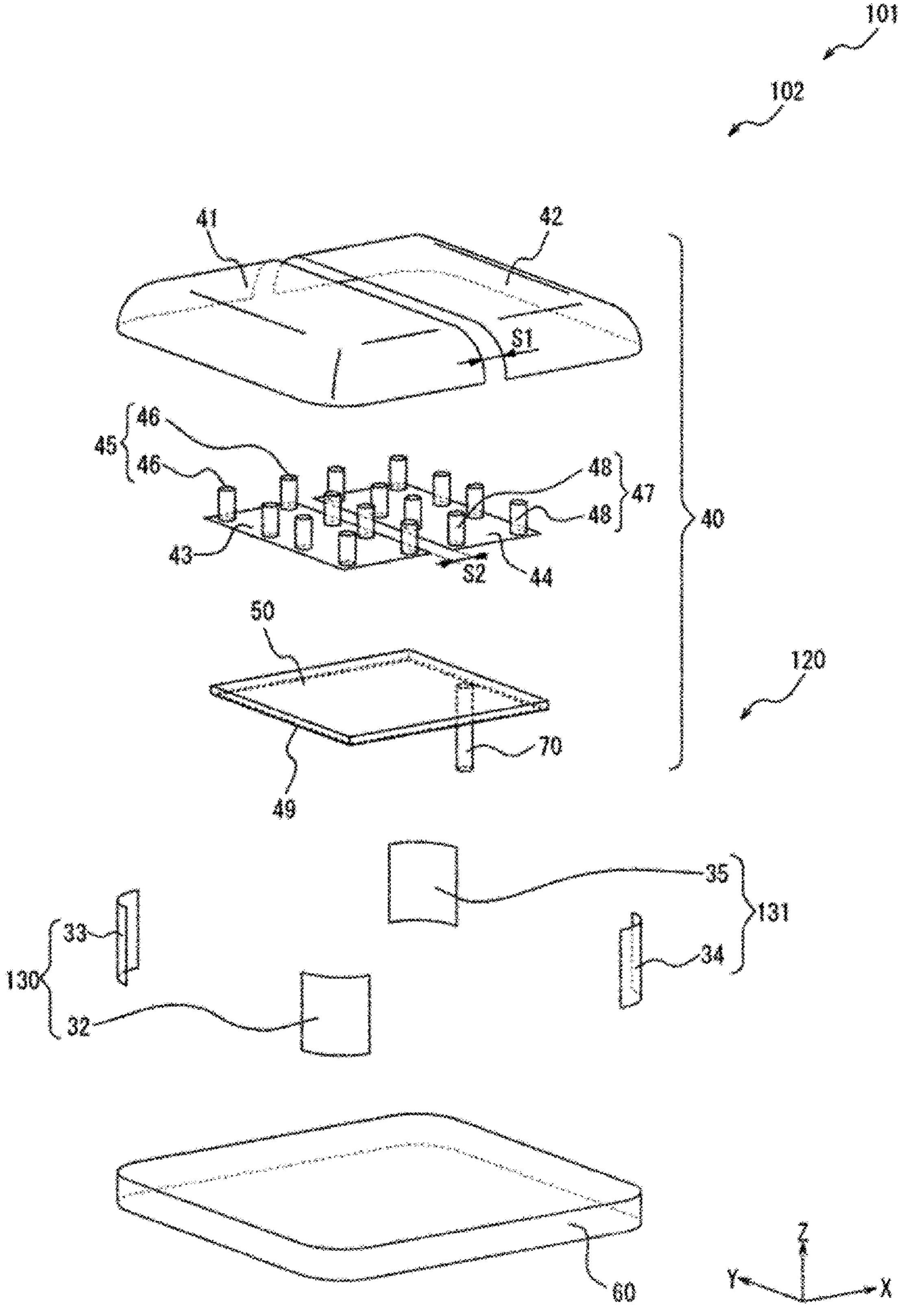
FIG. 7 is an exploded perspective view of a portion of the wireless communication device illustrated in FIG. 6.

FIG. 6 is a perspective view of a wireless communication device 101 according to the second embodiment of the present disclosure. FIG. 7 is an exploded perspective view of a portion of the wireless communication device 101 illustrated in FIG. 6.

As illustrated in FIG. 6, the wireless communication device 101 includes an antenna 102. The wireless communication device 101 may include the circuit board 80 as illustrated in FIG. 2. Also, as illustrated in FIG. 5, the wireless communication device 101 includes the wireless communication module 3, the sensor 91, the battery 92, the memory 93, and the controller 94. The wireless communication module 3 included in the wireless communication device 101 includes the antenna 102 and the RF module 90 as illustrated in FIG. 5.

As illustrated in FIGS. 6 and 7, the antenna 102 includes the housing 10, a first conductor group 120, and the power supply line 70. As illustrated in FIG. 7, the first conductor group 120 includes a first conductor 130, a second conductor 131, the second conductor group 40, and the third conductor 60.

As illustrated in FIG. 3, the first conductor 130 is located closer to the first surface 11 of the housing 10 as opposed to the second surface 12 of the housing 10. The first conductor 130 includes a conductor 32 and a conductor 33 of a first connection pair (electrical conductive first connection pair). The conductor 32 and the conductor 33 may be located at the two end portions of the first surface 11 of the housing 10 in the Y-direction. For example, the conductor 32 may be located between the first surface 11 and the fifth surface 15 of the housing 10. Also, the conductor 33 may be located between the first surface 11 and the sixth surface 16 of the housing 10.

As illustrated in FIG. 3, the second conductor 131 is located closer to the second surface 12 of the housing 10 than the first surface 11 of the housing 10. The second conductor 131 includes a conductor 34 and a conductor 35 of a second connection pair (electrical conductive second connection pair). The conductor 34 and the conductor 35 may be located at the two end portions of the second surface 12 of the housing 10 in the Y-direction. For example, the conductor 34 may be located between the first surface 12 and the fifth surface 15 of the housing 10. Also, the conductor 35 may be located between the second surface 12 and the sixth surface 16 of the housing 10.

The second conductor group 40 is located between the conductors 32, 33 of the first connection pair and the conductors 34, 35 of the second connection pair. When sympathetic vibration occurs in the first connection conductor 41 and the second connection conductor 42 in the X direction across the gap S1, as seen from the second conductor group 40, the negative X-axis side where the conductors 32, 33 of the first connection pair are located is treated as an electrical wall extending in the YZ plane. At this time, as seen from the second conductor group 40, the positive X-axis side where the conductors 34, 35 of the second connection pair are located is treated as an electrical wall extending in the YZ plane. Also, as in the first embodiment, the end of the second conductor group 40 on the positive Y-axis side and the end of the second conductor group 40 on the negative Y-axis side are electrically open. Thus, when sympathetic vibration occurs in the first connection conductor 41 and the second connection conductor 42 in the X direction across the gap S1, as seen from the second conductor group 40, the XZ plane on the positive Y-axis side and the XZ plane on the negative Y-axis side are treated as magnetic walls. The second conductor group 40 is surrounded by these two electrical walls and two magnetic walls in this manner, thus the antenna 102 exhibits artificial magnetic conductor specification with respect to a predetermined frequency of electromagnetic waves incident on the wireless communication device 101 from the negative Y-axis side.

The other configuration and effect of the antenna 102 according to the second embodiment is the same as the antenna 2 according to the first embodiment.

Third Embodiment

Figure 8:
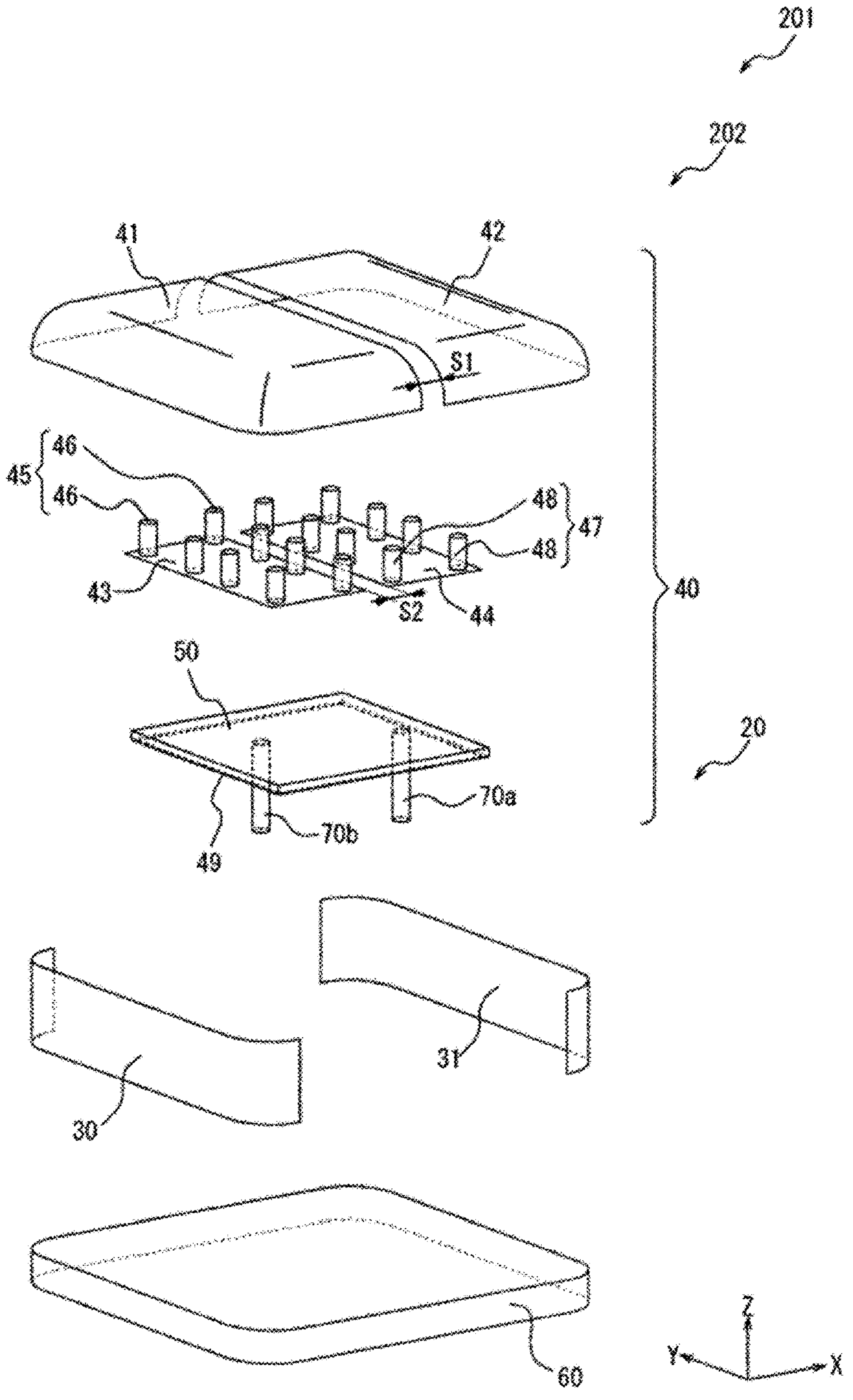
FIG. 8 is an exploded perspective view of a portion of a wireless communication device according to a third embodiment of the present disclosure.

FIG. 8 is an exploded perspective view of a portion of a wireless communication device 201 according to the third embodiment of the present disclosure. The shape of the wireless communication device 201 may be similar to the shape of the wireless communication device 1 illustrated in FIG. 1. The wireless communication device 101 may include the circuit board 80 as illustrated in FIG. 2. Also, as illustrated in FIG. 5, the wireless communication device 101 includes the wireless communication module 3, the sensor 91, the battery 92, the memory 93, and the controller 94. The wireless communication module 3 included in the wireless communication device 101 includes an antenna 102 and the RF module 90 as illustrated in FIG. 5.

The antenna 202 includes the first conductor group 20, a power supply line **70*a*, and a power supply line 70*b*. Similar to antenna 2 illustrated in FIG. 1, the antenna 202 includes the housing 10 as illustrated in FIG. 1. Instead of the first conductor group 20, the antenna 202 may include the first conductor group 120 illustrated in FIG. 7**.

The power supply line **70*a* and the power supply line 70*b* are electrically connected to any one portion of the second conductor group 40 included in the first conductor group 20. The signal propagating in the power supply line 70*a* and the signal propagating in the power supply line 70*b* correspond to differential signals. In the present embodiment, one end of the power supply line 70*a* and one end of the power supply line 70*b* are connected to the third inner conductor 49 of the second conductor group 40. The power supply line 70*a* and the power supply line 70*b* may be connected to positions at different portions of the third inner conductor 49. The other end of the power supply line 70*a* and the other end of the power supply line 70*b* are electrically connected to the RF module 90 included in the wireless communication device 201. The power supply line 70*a* and the power supply line 70*b* are located within the housing portion 17 of the housing 10 as illustrated in FIG. 2. The power supply line 70*a* and the power supply line 70*b* may extend along the Z direction. The power supply line 70*a* and the power supply line 70*b*** may each be a through hole conductor, a via conductor, or the like.

The other configuration and effect of the antenna 202 according to the third embodiment is the same as the antenna 2 according to the first embodiment.

The configurations according to the present disclosure are not limited only to the embodiments described above, and some variations or changes can be made. For example, the functions and the like included in each of the components and the like can be rearranged as long as logically inconsistencies are avoided, and multiple components can be combined into one or divided.

For example, the above-described shape of the wireless communication device 1, 101 is roughly a square prism. However, the shape of the wireless communication device 1, 101 is not limited to being roughly a square prism. For example, the shape of the wireless communication device 1, 101 can be roughly rectangular. For example, in a case where the shape of the wireless communication device 1 is roughly rectangular, the antenna 2 can emit at least one of electromagnetic waves at a frequency corresponding to the length of the long sides of the rectangular parallelepiped and electromagnetic waves at a frequency corresponding to the length of the short sides of the rectangular parallelepiped.

For example, the wireless communication device 1, 101, 201 described above includes the battery 92. However, the wireless communication device 1, 101, 201 may not include the battery 92. In this case, the wireless communication device 1, 101 may include an energy harvesting device. Examples of an energy harvesting device include a type that converts sunlight into electrical power, a type that converts vibration into electrical power, a type that converts heat into electrical power, and the like.

The drawings for describing the configuration according to the present disclosure are schematic. The dimensional proportions and the like in the drawings do not necessarily coincide with the actual values.

In the present disclosure, "first", "second", "third", and the like are examples of identifiers for distinguishing the configurations. Configurations distinguished in the description by "first", "second", and the like in the present disclosure are interchangeable in terms of the number of the configuration. For example, the first conductor can exchange the identifiers, "first" and "second" with the second conductor. The identifiers are interchanged simultaneously. The configurations are distinguished after the identifiers are interchanged. The identifiers may be deleted. Configurations with deleted identifiers are distinguished by reference signs. No interpretation of the order of the configurations, no grounds for the presence of an identifier of a lower value, and no grounds for the presence of an identifier of a higher value shall be given based solely on the description of identifiers such as "first" and "second" in the present disclosure.

REFERENCE SIGNS LIST

1, 101, 201 Wireless communication device
2, 102, 202 Antenna
3 Wireless communication module
4 Metal plate
10 Housing
11 First surface
12 Second surface
13 Third surface
14 Fourth surface
15 Fifth surface
16 Sixth surface
17 Housing portion
20, 120 First conductor group
21 First end portion
22 Second end portion
30, 130 First conductor
31, 131 Second conductor
32, 33, 34, 35 Conductor
40 Second conductor group
41 First connection conductor
42 Second connection conductor
43 First inner conductor
44 Second inner conductor
45 First conductor set
46 Third connection conductor
47 Second conductor set
48 Fourth connection conductor
49 Third inner conductor
50 Dielectric substrate
60 Third conductor
70, **70*a*, 70*b*** Power supply line
80 Circuit board
81 Insulation substrate
82, 83 Conductor layer
90 RF module
91 Sensor
92 Battery
93 Memory
94 Controller

The invention claimed is:

1. An antenna, comprising:
a housing made of a resin, a first conductor group, and a power supply line, wherein
the housing comprises
a first surface and a second surface facing each other in a first direction,
a third surface extending in the first direction and connecting the first surface and the second surface,
a fourth surface facing the third surface in a second direction intersecting the first direction, and
a housing portion surrounded by the first surface, the second surface, the third surface, and the fourth surface;
the first conductor group comprises
a first conductor located closer to the first surface than the second surface,
a second conductor located closer to the second surface than the first surface,
a second conductor group extending along the third surface capacitively coupling the first conductor and the second conductor, and
a third conductor extending along the fourth surface electrically connecting the first conductor and the second conductor; and
the power supply line is connected to any one portion of the second conductor group.

2. The antenna according to claim 1, wherein
the second conductor group comprises
a first connection conductor connected to the first conductor and extending along the third surface,
a second connection conductor connected to the second conductor and extending along the third surface, the second connection conductor being capacitively coupled to the first connection conductor,
a first inner conductor extending along the third surface and located closer to the housing portion than the first connection conductor,
a second inner conductor extending along the third surface and located closer to the housing portion than the second connection conductor,
a first conductor set electrically connecting the first connection conductor and the first inner conductor, and
a second conductor set electrically connecting the second connection conductor and the second inner conductor.

3. The antenna according to claim 2, further comprising a capacitor connected between the first inner conductor and the second inner conductor.

4. The antenna according to claim 2, further comprising a third inner conductor capacitively coupling the first inner conductor and the second inner conductor.

5. The antenna according to claim 2, wherein the first conductor set comprises a plurality of third connection conductors.

6. The antenna according to claim 5, wherein at least two of the plurality of third connection conductors are located separated in the first direction.

7. The antenna according to claim 2, wherein the second conductor set comprises a plurality of fourth connection conductors.

8. The antenna according to claim 7, wherein at least two of the plurality of fourth connection conductors are located separated in the first direction.

9. The antenna according to claim 1, wherein the first conductor comprises a first connection pair with electrical conductivity located at two end portions of the first surface in a third direction intersecting the first direction and the second direction; and the second conductor comprises a second connection pair with electrical conductivity located at two end portions of the second surface in the third direction.

10. An antenna, comprising:
a housing that is made of a resin and that comprises a housing portion; and
a first conductor group including a first end portion and a second end portion separated from each other in a first direction, the first conductor group surrounding a front surface of the housing, wherein
the first conductor group comprises
a first inner conductor and a second inner conductor capacitively coupled to each other, at least a portion of the first inner conductor and at least a portion of the second inner conductor being exposed to the housing portion,
a first conductor set electrically connecting a region near the first end portion of the first conductor group and the first inner conductor, and
a second conductor set electrically connecting a region near the second end portion of the first conductor group and the second inner conductor.

11. A wireless communication module, comprising:
the antenna according to claim 1; and
an RF module located within the housing portion.

12. A wireless communication device, comprising:
the wireless communication module according to claim 11; and
a sensor located within the housing portion.

* * * * *